United States Patent [19]

Kobayashi

[11] Patent Number: 5,066,266

[45] Date of Patent: Nov. 19, 1991

[54] TRANSMISSION ARRANGEMENT FOR VEHICLE HAVING MOTOR SHAFT PARALLEL TO AUXILIARY SHAFT WHICH DRIVES A FLUID COUPLING THROUGH A PLANETARY GEAR REDUCTION

[75] Inventor: Manabu Kobayashi, Iwata, Japan

[73] Assignee: Yamaha Hatsudoki Kabushiki Kaisha, Iwata, Japan

[21] Appl. No.: 627,727

[22] Filed: Dec. 14, 1990

[30] Foreign Application Priority Data

Dec. 15, 1989 [JP] Japan .................................. 1-323988

[51] Int. Cl.⁵ .......................................... F16H 37/08
[52] U.S. Cl. ..................................... 475/59; 475/200; 475/206; 180/297
[58] Field of Search ................... 475/59, 71, 200, 206, 475/198; 180/297

[56] References Cited

U.S. PATENT DOCUMENTS

| 4,431,079 | 12/1984 | Suzuki | 180/297 X |
| 4,722,235 | 12/1988 | Kumazawa | 180/297 X |
| 4,938,097 | 7/1990 | Pierce | 475/206 X |
| 4,938,098 | 7/1990 | Sasaki et al. | 475/200 |
| 4,974,473 | 12/1990 | Hatakeyama | 475/200 X |

FOREIGN PATENT DOCUMENTS

| 1339113 | 8/1963 | France | 475/206 |
| 57-173641 | 10/1982 | Japan | 473/206 |

*Primary Examiner*—Allan D. Herrmann
*Assistant Examiner*—William O. Trousdell
*Attorney, Agent, or Firm*—Ernest A. Beutler

[57] ABSTRACT

A power unit for a vehicle having a transversely disposed engine and wherein the engine ouput shaft drives an auxiliary shaft which is disposed on one side of the engine output shaft and which rotates about an axis parallel to the axis of the engine output shaft. A torque converter or fluid coupling is driven from this auxiliary shaft through a planetary transmission so as to reduce the speed at which the torque converter or fluid coupling is driven relative to the auxiliary shaft.

18 Claims, 3 Drawing Sheets

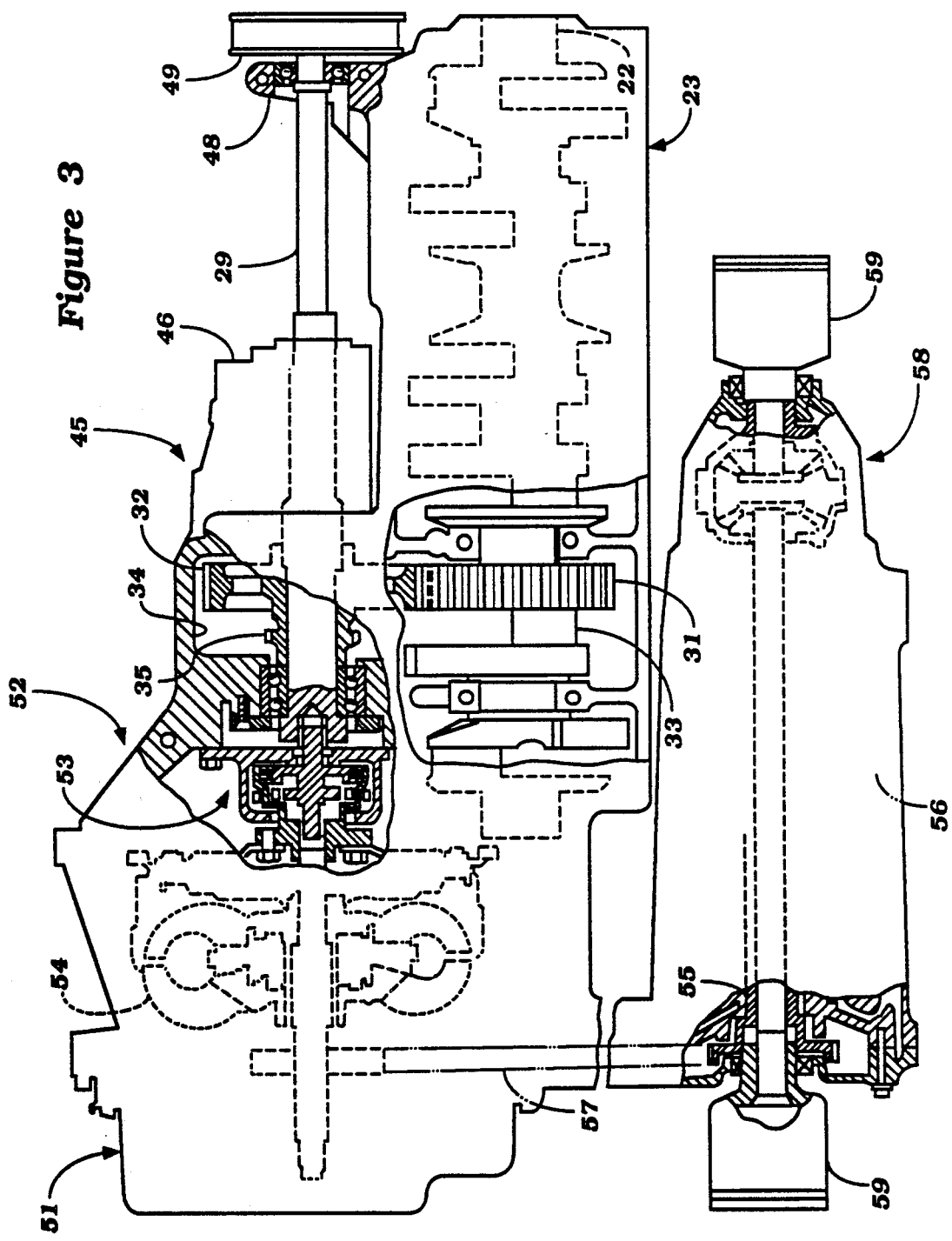

TRANSMISSION ARRANGEMENT FOR VEHICLE HAVING MOTOR SHAFT PARALLEL TO AUXILIARY SHAFT WHICH DRIVES A FLUID COUPLING THROUGH A PLANETARY GEAR REDUCTION

BACKGROUND OF THE INVENTION

This invention relates to a transmission arrangement for a vehicle and more particularly to an improved engine transmission arrangement for driving a motor vehicle.

As is well known, it has been proposed to provide transverse engine placement in vehicles to provide a more compact engine compartment and power arrangement. Although the transverse engine placement has a number of advantages, it also presents certain problems in connection with layout of the drive train. A type of engine and transmission arrangement that has high utility is disclosed in copending application entitled "Engine Unit For Vehicle", Ser. No. 270,357, filed Nov. 14, 1988, now U.S. Pat. No. 5,024,287, in the name of Karou Okui and assigned to the Assignee of this application. In the arrangement shown in that application, there is provided an in line engine in which the engine output shaft drives an auxiliary shaft which, in turn, drives the valve train and a transmission for powering the vehicle. Such an arrangement provides a very effective and compact power unit.

In order to improve the performance of an engine while maintaining a small size, it is well known to run the engine at higher engine speeds. At higher engine speeds, a greater power can be attained for a given displacement. However, in many instances, it is desirable to employ a transmission that includes either a fluid coupling or a torque converter so as to provide automatic gear selection. Most torque converters or fluid couplings are designed so as to operate at relatively low maximum engine speeds. Therefore, existing fluid couplings and torque converters cannot be utilized practically in connection with engines having high engine speed.

Also, if the torque converter or fluid coupling is to be driven at a high engine speed, then the size of the torque converter can become quite large and make compact arrangement more difficult.

It is, therefore, a principal object of this invention to provide an improved transmission arrangement for an internal combustion engine which is compact and which nevertheless permits the use of a fluid coupling that can be small in size without restricting the engine speed.

It is a further object of this invention to provide an improved arrangement for driving a fluid coupling from an engine through a reduction train which will insure that the design speed for the coupling is not exceeded regardless of the engine speed.

SUMMARY OF THE INVENTION

This invention is adapted to be embodied in a transmission arrangement for an internal combustion engine having an output shaft journaled for rotation about a first axis. An auxiliary shaft is driven by the output shaft and is rotatable about a second axis that is parallel to the first axis. A fluid coupling is provided and the fluid coupling is driven from the output shaft by a transmission that reduces the speed of drive of the fluid coupling relative to the speed of rotation of the auxiliary shaft.

BRIEF DESCRIPTION OF THE DRAWINGS

FIG. 3 is a view taken generally along the line 3—3 of FIG. 1 on an enlarged scale and with portions broken away.

DETAILED DESCRIPTION OF THE PREFERRED EMBODIMENTS

Figure 1:
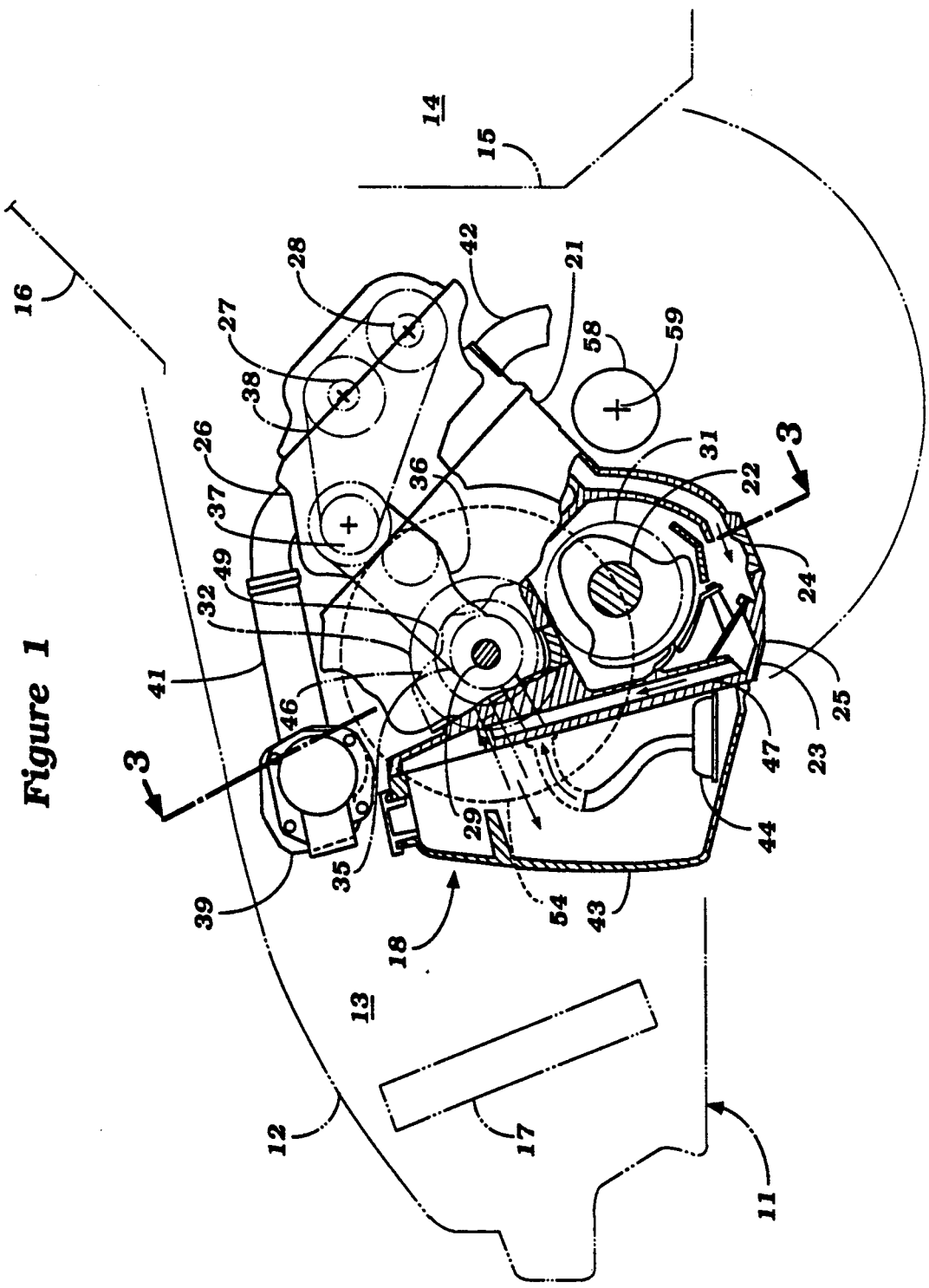
FIG. 1 is a side elevational view of a portion of a motor vehicle powered by an internal combustion engine and transmission arrangement constructed in accordance with an embodiment of the invention, with portions broken away and with portions of the vehicle shown in phantom.
Figure 2:
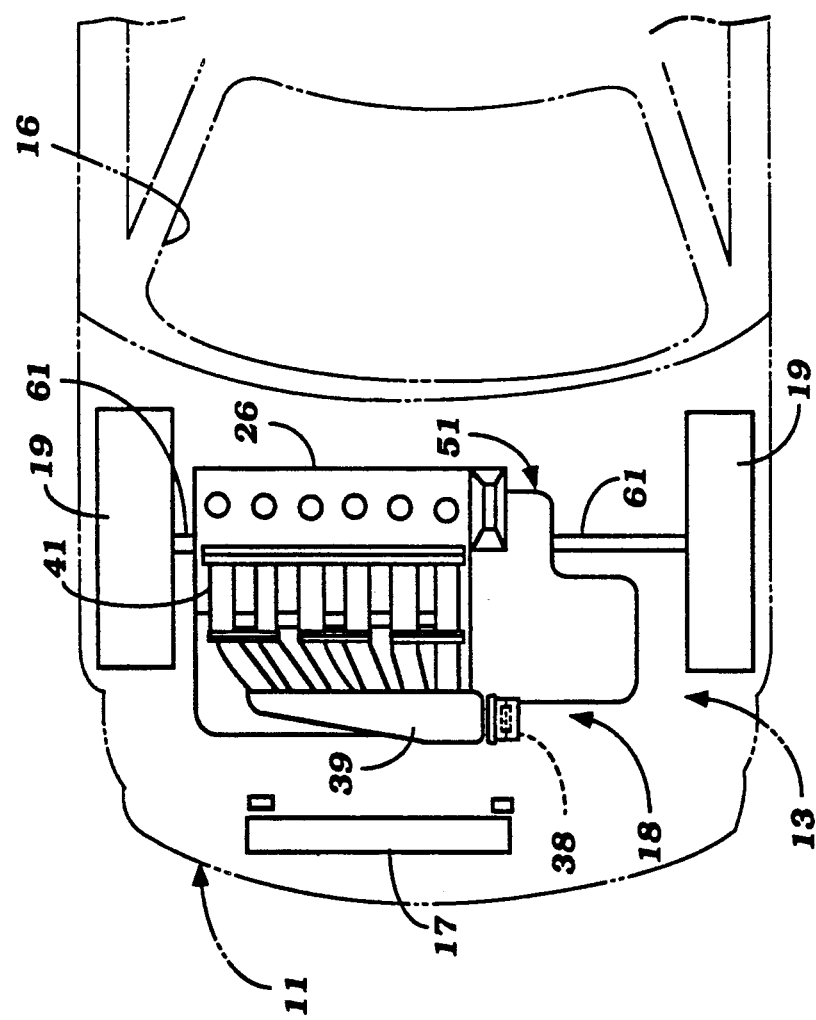
FIG. 2 is a reduced scale top plan view of the motor vehicle, again showing certain portions of the vehicle in phantom.

A motor vehicle powered by an engine transmission unit constructed in accordance with an embodiment of the invention is shown partially in phantom in FIGS. 1 and 2 and is identified generally by the reference numeral 11. The motor vehicle 11 is, in the illustrated embodiment, of the front engine, front wheel drive type. It is to be understood, however, that certain facets of the invention may be employed with rear engine, rear wheel drive vehicles or, in some instances, in connection with vehicles having longitudinally extending rather than transversely disposed engines.

The motor vehicle 11 is comprised of a hood portion 12 that slopes generally downwardly and which encloses an engine compartment 13. The engine compartment 13 is positioned forwardly of a passenger compartment 14 and which is separated from it by a toe board 15. A windshield 16 extends upwardly at the rear end of the hood 12.

An air inlet opening (not shown) is positioned forwardly of the engine compartment 13 and a cross flow radiator 17 is positioned immediately to the rear of this opening. Behind the radiator 17 is positioned a combined engine transmission unit, indicated generally by the reference numeral 18 and constructed in accordance with a preferred embodiment of the invention. This engine unit 18 drives a pair of front wheels 19 which have their rotational axes extending transversely across the engine compartment 13 forwardly of the toe board 15.

The engine transmission unit 18 includes an internal combustion engine having a cylinder block 21 that is provided with a plurality of aligned cylinder bores. In a preferred embodiment of the invention, the cylinder block 21 forms six aligned cylinders and pistons reciprocally supported in these cylinder bores drive a crankshaft 22 that is rotatable about a transverse axis that is parallel to the axis of rotation of the front wheels 19 and spaced forwardly therefrom. Since the basic construction of the internals of the engine of the power unit 18 are not critical to the invention, except as hereinafter noted, these details of the engine construction have not been illustrated, nor have they been described. Reference may be had to copending application Ser. No. 270,357, U.S. Pat. No. 5,024,287, for the details of the engine construction which are not illustrated or described herein.

The crankshaft 22 is journaled in a suitable manner within a crankcase, indicated generally by the reference numeral 23 and which is comprised of a first member 24 that is affixed to the base of the cylinder block 21 and a second member 25 which is affixed to the first member 24 and to the cylinder block in a suitable manner. Again, reference may be made to the aforenoted application for the details of this construction.

A cylinder head assembly, indicated generally by the reference numeral 26 is affixed to the cylinder block 21 in an appropriate manner and contains a valve mechanism for admitting and discharging a charge to the individual combustion chambers. Preferably, this valve mechanism is of the multiple valve type and includes two or more intake valves and two or more exhaust valves. The intake and exhaust valves are operated by means of respective overhead mounted intake and exhaust camshafts 27 and 28 which are journaled in the cylinder head assembly 26 in an appropriate manner.

As noted in the aforenoted copending application, the crankshaft 22 of the engine is not the direct output shaft of the engine, but rather drives an auxiliary shaft, indicated generally by the reference numeral 29 which rotates about an axis that is disposed parallel to the axis of rotation of the crankshaft 22, but forward and above it, as may be best seen in FIG. 1. The auxiliary shaft 29 is driven from the crankshaft 22 by means of a pair of intermeshing gears 31 and 32. The gear 31 is formed integrally on the crankshaft 22 adjacent a throw 33 which is not the end throw of the crankshaft. That is, the gear train 31, 32 is disposed between the ends of the crankshaft 22 so as to provide a more compact assembly.

The gears 31 and 32 are contained within a chamber 34 which is formed in part by the crankcase 23. Adjacent the gear 32, which is affixed, as by a splined connected, to the shaft 29, there is provided a sprocket 35. The sprocket 35 drives a primary chain 36 which, in turn, drives an intermediate shaft 37 which is journaled in the cylinder head assembly 26. A secondary chain 38 drives the intake and exhaust camshafts 27 and 28 from this intermediate shaft 37. This type of camshaft drive is also described in my copending application Ser. No. 270,357, U.S. Pat. No. 5,024,287.

As noted in the aforenoted copending application, the ratio between the gears 31 and 32 may be less than 1 to 1 so that the auxiliary shaft 29 rotates at a slightly slower speed than the crankshaft 22 or, alternatively, there may be a unitary speed ratio between these shafts. In the specific embodiment illustrated, the ratio between the crankshaft 22 and the auxiliary shaft 29 is 0.9 to 1 so that the auxiliary shaft rotates slightly slower than the crankshaft. The remainder of the drive for the camshafts will reduce the speed of rotation of the intake and exhaust camshafts 27 and 28 will rotate at one half of crankshaft speed.

The engine of the power unit 18 is provided with an induction system that includes a throttle body in which a throttle valve 38 is provided which is positioned at one end of a transversely extending plenum chamber 39. A manifold system 41 interconnects the plenum chamber 39 with the intake ports of the engine which are on the forward side of the cylinder head assembly 26. As readily apparent in FIG. 1 and as described in the aforenoted copending application, the cylinder block 21 is inclined rearwardly so as to permit a low hood line and also a compact configuration.

An exhaust manifold 42 is affixed to the rear or underside of the cylinder head assembly 26 and the exhaust gases are discharged therefrom to an exhaust system (not shown) for silencing treatment and discharge to the atmosphere.

As is disclosed in one embodiment of copending application Ser. No. 270,357, U.S. Pat. No. 5,024,287, the power unit 18 is provided with a dry sump lubrication system that includes a dry sump tank 43 that is positioned forwardly of the engine and which may be formed in part by the crankcase piece 23. An oil strainer 44 is positioned in the lower end of the dry sump tank 43 and oil is drawn from this strainer through a pump assembly indicated generally by the reference numeral 45 for delivery to the engine lubrication system. The pump 45 is driven off of the auxiliary shaft 29 and includes a pump housing 46 as may be best seen in FIG. 3. This pump assembly 45 further includes one or more scavenge pumps which draw lubricant from the crankcase chamber through a scavenge line 47 for return to the dry sump tank 43.

The auxiliary shaft 29 is journaled in part by a bearing carried by a boss 48 (FIG. 3) formed at one end of the crankcase 23 and inwardly of the adjacent main bearing of the crankshaft 22. An accessory drive pulley 49 is fixed to the auxiliary shaft 29 in this area and may drive a plurality of accessories such as power steering pumps, alternators, air conditioning compressors or the like.

The foregoing description of the power unit 18 is for general information only. As has been noted, the internal details of the construction of the engine portion of this power unit may be considered to be of the type generally described in copending application Ser. No. 270,357, U.S. Pat. No. 5,024,287, the disclosure of which is hereby incorporated by references.

It should be readily apparent that the invention may be practiced with engines of various other types, although the engine has particular utility in conjunction with arrangements wherein the output shaft of the power unit is not the engine crankshaft 22, but an auxiliary shaft such as the auxiliary shaft 29.

In accordance with the invention, a transfer gear case 51 is provided at one end of the engine and includes a first portion 52 that is adjacent the crankcase recess 34 in which the auxiliary shaft drive gear 31 and 32 and the camshaft drive sprocket 35 are contained. Immediately adjacent the recess 34, there is provided a relatively small planetary gear set 53 that provides a speed reduction from the speed of the auxiliary shaft 29 to drive a torque converter, indicated by the reference numeral 54, at a speed less than the speed of the auxiliary shaft 29 and speed of the crankshaft 22. The invention is described in conjunction with a torque converter 54, but it is to be understood that it may also be employed with a fluid coupling and such fluid drives are generally referred to by the term "fluid coupling". Said another way, as used in the specification and claims hereof, a fluid coupling is intended to encompass a torque converted as well as fluid couplings per se.

Because of the use of the planetary gear set 53, the torque converter or fluid coupling 54 may be designed to operate at speeds lower than the normal maximum rotational speed of the engine and specifically its crankshaft 22. This permits a compact assembly. Also, it should be noted that the diameter of the torque converter 54 is such that it extends outwardly to almost to or directly to the rotational axis of the crankshaft 22. Because of its offset nature, this is possible without making the power unit 18 unduly bulky.

Power is transmitted from the output of the torque converter 54 to a quill input shaft 55 of an automatic change speed transmission, indicated generally by the reference numeral 56 through a drive chain 57. Alternatively, a gear drive may be employed. Also contained within this change speed transmission 56 is a differential assembly 58 which, in turn, drives respective universal joints 59 which are, in turn, coupled to axle shafts 61 (FIG. 2) for driving the front wheels 19.

The planetary transmission 53 permits an in line relationship between the torque converter 54 and the auxiliary shaft 29 and thus provides a more compact assembly in addition to providing the speed reduction. Hence, the use of a planetary transmission has the advantages of not only providing a speed reduction, but permits the coaxial disposition of the auxiliary shaft 29 and the torque converter 54.

The planetary transmission 53 may be operated so that it provides a constant speed reduction at all engine speeds. Alternatively, the transmission 53 may be constructed and operated in such a way so as to only provide a speed reduction as the engine speed reaches maximum speed. If this is done, then the change speed transmission 56 should be governed accordingly so as to compensate for this change in speed of the torque converter 54 when the planetary transmission 53 is shifted. That is, a lesser speed reduction for the high gear of the transmission 56 would be employed due to the interpositioning of the planetary transmission 53 which is shifted at the same time the change speed transmission is shifted. In this way, it is possible to have a direct drive for the change speed transmission 56 at lower engine speeds and an indirect drive as the engine speed increases while still maintaining the desired overall transmission ratio between the engine output shaft 22 and the axle shafts 61.

In the illustrated embodiment, the oil pump assembly 45 was driven at the same speed as the auxiliary shaft 29. It may be possible, if desired, to drive the pump assembly 45 downstream of the planetary gear set 53 so as also to provide a speed reduction in the speed of operation of the oil pump 45 for the same reasons as aforenoted.

It should be readily apparent from the foregoing description that the described construction permits a very compact power unit and permits the use of a torque converter which may have speed capabilities substantially less than the actual speed at which the engine operates. Of course, the foregoing description is that of a preferred embodiment of the invention. Various changes and modifications may be made without departing from the spirit and scope of the invention, as defined by the appended claims.

What is claimed is:

1. A transmission arrangement for an internal combustion engine having an output shaft journaled for rotation about a first axis, an auxiliary shaft driven by said output shaft and rotatable about a second axis parallel to said first axis, a fluid coupling, and transmission means for driving said fluid coupling from said auxiliary shaft at a reduced speed ratio.

2. A transmission arrangement as set forth in claim 1 wherein the axis of rotation of the fluid coupling is coaxial with the second axis.

3. A transmission arrangement as set forth in claim 2 wherein the transmission means comprises a planetary transmission.

4. A transmission arrangement as set forth in claim 3 wherein the planetary transmission is shiftable between two different speed ratios.

5. A transmission arrangement as set forth in claim 3 wherein the fluid coupling drives a change speed transmission.

6. A transmission arrangement as set forth in claim 5 wherein the input shaft for the change speed transmission is rotatable about a third axis parallel to the first and second axes and positioned on the opposite side of the first axis from the second axis.

7. A transmission arrangement as set forth in claim 5 wherein the means for driving the auxiliary shaft from the engine output shaft is positioned between the ends of the engine output shaft.

8. A transmission arrangement as set forth in claim 7 wherein the input shaft for the change speed transmission is rotatable about a third axis parallel to the first and second axes and positioned on the opposite side of the first axis from the second axis.

9. A transmission arrangement as set forth in claim 7 further including at least one camshaft for operating valves of the engine and driven from the auxiliary shaft.

10. A transmission arrangement as set forth in claim 1 wherein the fluid coupling comprises a torque converter and wherein the radius of the torque converter is substantially equal to the distance between the first and second axes.

11. A transmission arrangement as set forth in claim 10 wherein the axis of rotation of the torque converter is coaxial with the second axis.

12. A transmission arrangement as set forth in claim 11 wherein the transmission means comprises a planetary transmission.

13. A transmission arrangement as set forth in claim 12 wherein the planetary transmission is shiftable between two different speed ratios.

14. A transmission arrangement as set forth in claim 12 wherein the torque converter drives a change speed transmission.

15. A transmission arrangement as set forth in claim 14 wherein the input shaft for the change speed transmission is rotatable about a third axis parallel to the first and second axes and positioned on the opposite side of the first axis from the second axis.

16. A transmission arrangement as set forth in claim 14 wherein the means for driving the auxiliary shaft from the engine output shaft is positioned between the ends of the engine output shaft.

17. A transmission arrangement as set forth in claim 16 wherein the input shaft for the change speed transmission is rotatable about a third axis parallel to the first and second axes and positioned on the opposite side of the first axis from the second axis.

18. A transmission arrangement as set forth in claim 16 further including at least one camshaft for operating valves of the engine and driven from the auxiliary shaft.

* * * * *